3 Sheets—Sheet 1.
J. KEATS & W. S. CLARK,
Said Clark assignor to J. Batley.
SEWING-MACHINE.
No. 7,806. Reissued July 24, 1877.
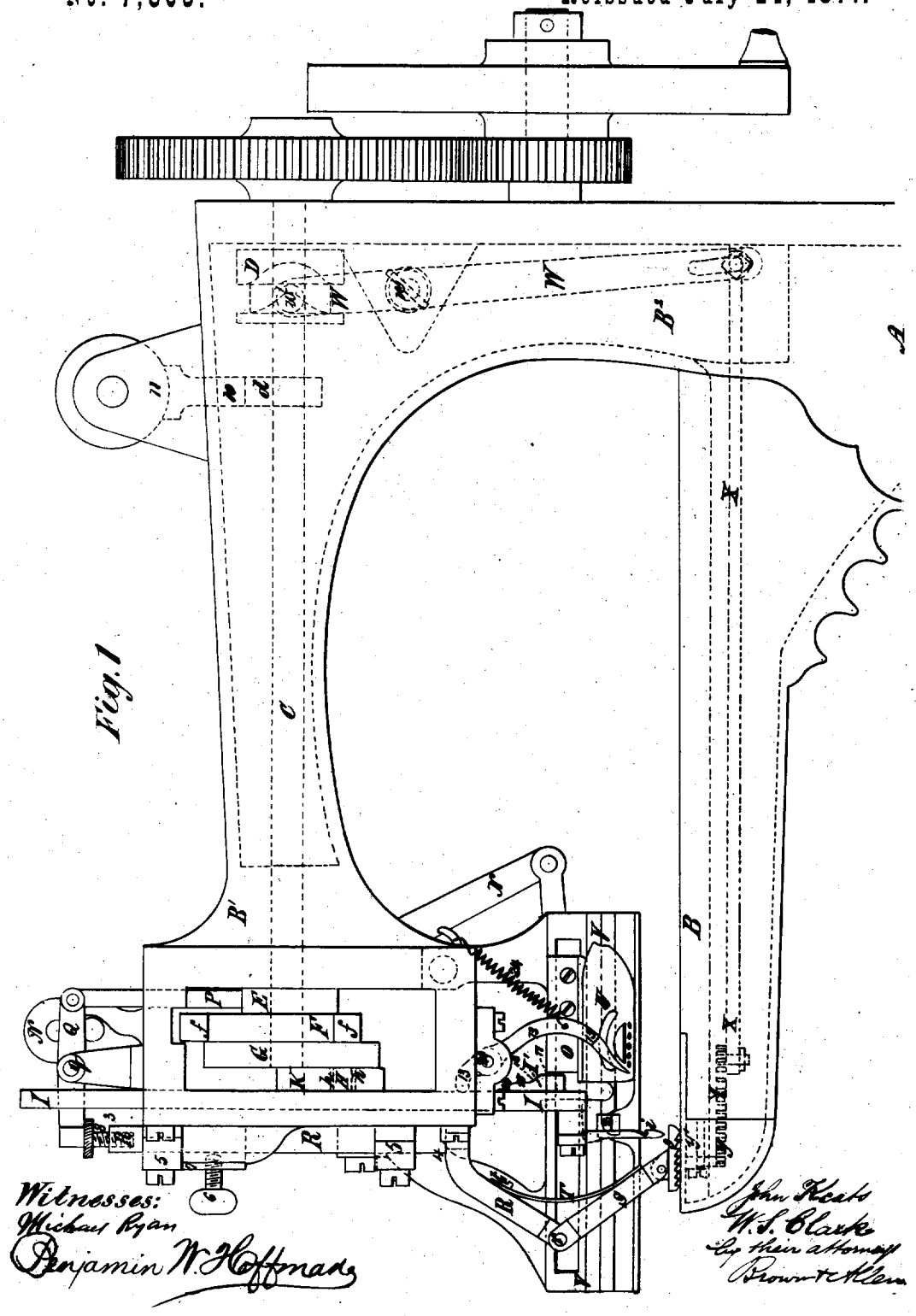

3 Sheets—Sheet 2.
J. KEATS & W. S. CLARK,
Said Clark assignor to J. Batley.
SEWING-MACHINE.
No. 7,806. Reissued July 24, 1877.
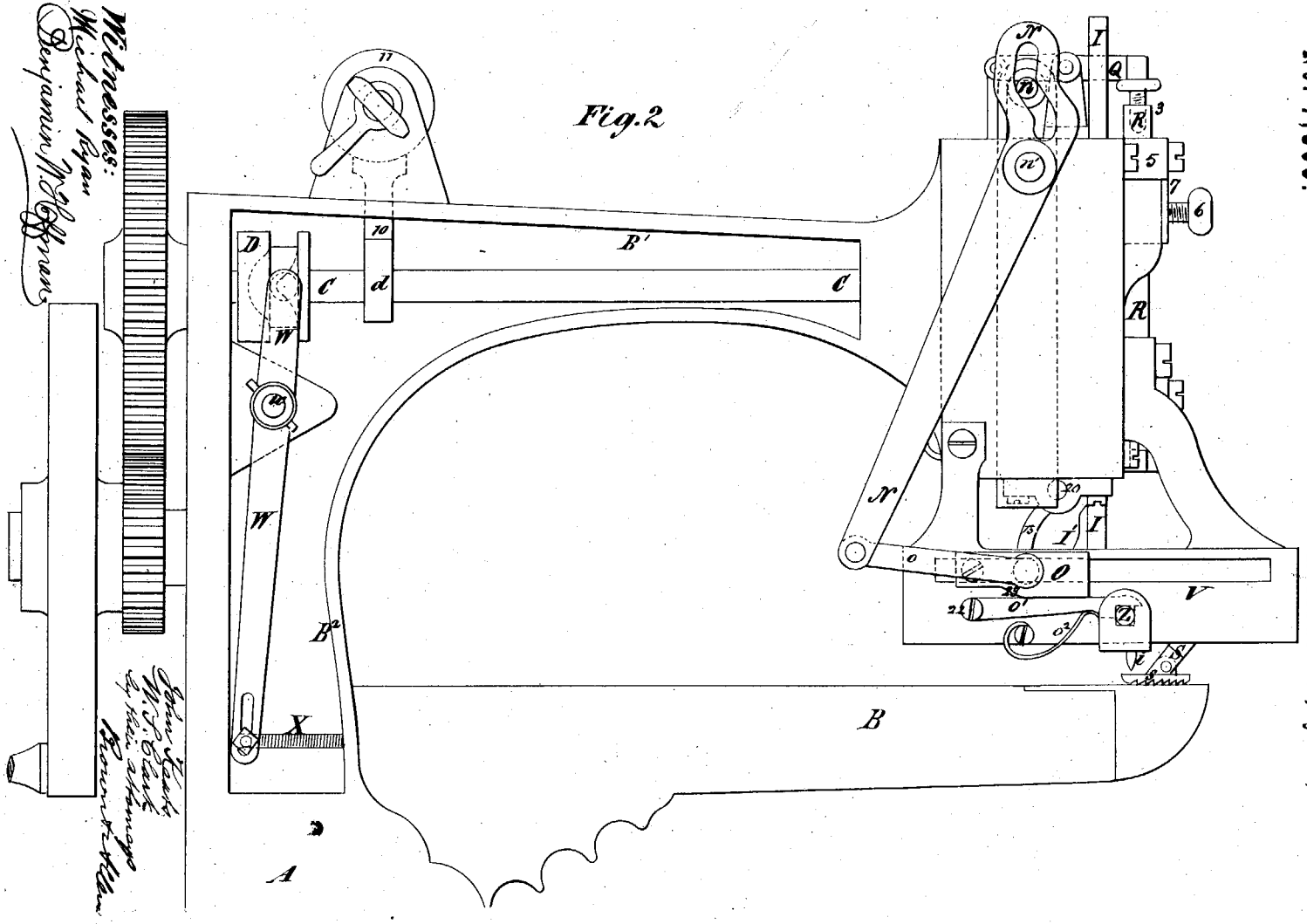
Witnesses:
Michael Ryan
Benjamin W. Hoffman
John Keats
W. S. Clark
by their attorneys
Brown & Allen 3 Sheets—Sheet 3.
J. KEATS & W. S. CLARK,
Said Clark assignor to J. Batley.
SEWING-MACHINE.
No. 7,806. Reissued July 24, 1877.
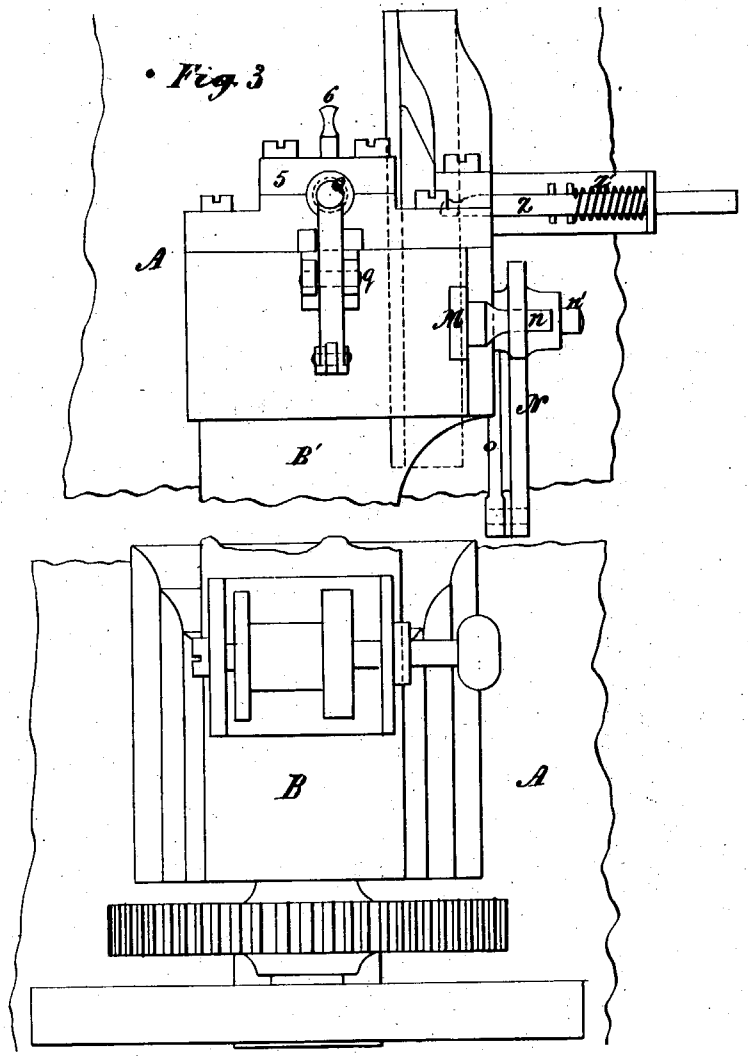
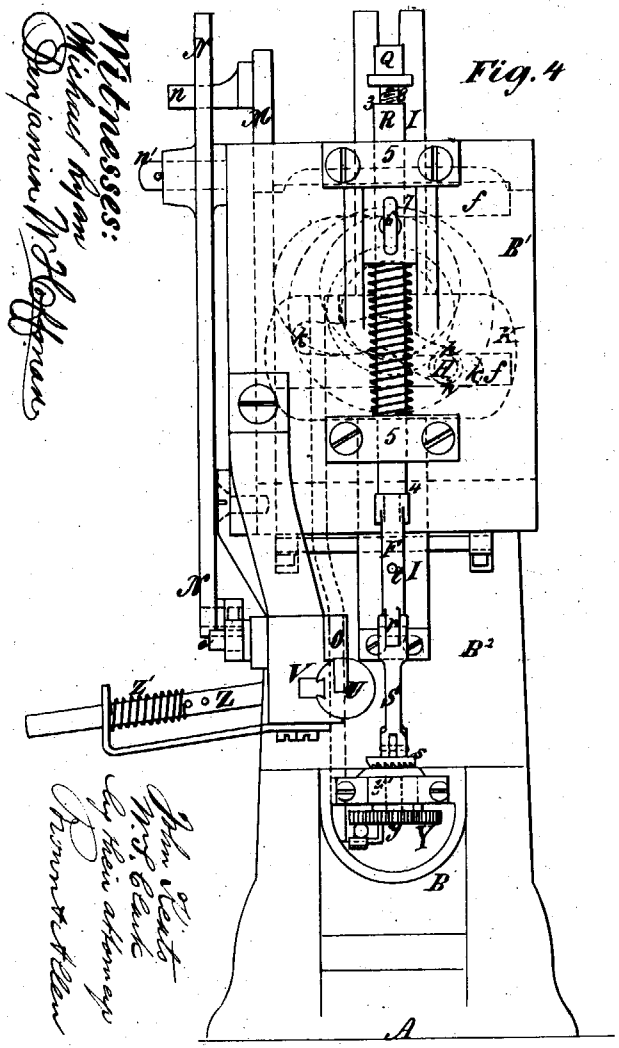
Witnesses:
Michael Ryan
Benjamin W. Hoffman
John Keats
W. S. Clark
by their attorneys
Munn & Allen

UNITED STATES PATENT OFFICE.

JOHN KEATS, OF WOOD GREEN, MIDDLESEX COUNTY, AND WILLIAM STEPHENS CLARK, OF STREET, SOMERSET COUNTY; SAID CLARK ASSIGNOR TO JOHN BATLEY, OF KENSINGTON PARK GARDENS, MIDDLESEX COUNTY, ENGLAND.

IMPROVEMENT IN SEWING-MACHINES.

Specification forming part of Letters Patent No. 50,995, dated November 14, 1865; antedated April 14, 1863; Reissue No. 7,806, dated July 24, 1877; application filed June 15, 1877.

*To all whom it may concern:*

Be it known that we, JOHN KEATS, formerly of Street, in the county of Somerset, England, and now of Wood Green, in the county of Middlesex, England, and WILLIAM STEPHENS CLARK, of Street aforesaid, have invented or discovered new and useful Improvements in Sewing-Machines; and we do hereby declare the nature of the said invention, and in what manner the same is to be performed, to be particularly described and ascertained in and by the following statement thereof—that is to say:

This invention has for one of its objects to obtain a sewing-machine which will produce a lock-stitch with two waxed threads.

One part of the invention consists in the combination, in a sewing-machine, of the following instrumentalities, viz., a table or surface on which the material to be sewed is supported, a feeding instrument to move the material along said table or surface, a hook to draw one thread through the material in the form of a loop, a rotating thread guide or carrier to place the said thread in proper relation to the said hook to be caught thereby, and a shuttle arranged on the same side of the table with the material to pass the other thread through the loop of the first-named thread, the whole co-operating as hereinafter described.

Another part of the invention consists in placing the shuttle and shuttle-race of a sewing-machine above the table or surface on which the material to be sewed is supported, or on the same side of said table or surface on which the material is to be sewed is placed, and in the combination on the same side of such table or surface of a shuttle for carrying one of two threads for making a stitch, and a hook for drawing the other of the said threads through the material in the form of a loop for the passage of the shuttle through it.

Another improvement consists in the combination, with a hook and a shuttle, both placed on the same side of the table or surface on which the material to be sewed is supported, and co-operating to produce a stitch with two threads, of an instrument for dividing and opening the loop drawn through the material by the hook, and thereby facilitating the entry of the shuttle into said loop, and for assisting in the removal of the said loop from the hook.

Another improvement relates to the whirl or carrier rotating in opposite directions alternately, for the purpose of conducting the thread, to lay it into the hook in that class of sewing-machines in which a hook or hooked needle is used to draw a thread in the form of a loop through the material being sewed. In such sewing-machines the movements of the whirl or carrier and of the needle have, prior to our invention, been so timed with reference to each other that a part of the movement of the whirl or carrier has been made during such stages in the ascent of the needle that there has, during such movement, been a tension upon the loop, which is objectionable, not only on account of the additional wear thereby produced on the whirl or carrier, but also on account of the additional wear thereby produced on the thread and upon the hook where the thread is in contact with the hook. The object of this improvement relating to the said whirl or carrier is to produce all the necessary movements thereof while the loop is slack; and the said improvement consists in a system of timing the movements of the whirl or carrier and the hook, which will be hereinafter more fully described, whereby the said object is attained, and the twisting of the loop in such manner as to render it liable to be brought into the path of the needle is avoided.

Another improvement consists in a novel combination of mechanism for operating the needle-bar, the feeding device, and the shuttle in sewing-machines; and a further improvement consists in a novel feeding mechanism, whereby provision is made for feeding the work in various directions.

Having thus stated the nature of the said invention, we will proceed more fully to describe it with reference to the accompanying drawings, in which—

Figures 1 and 2 represent the two opposite side elevations of a machine which illustrates all our improvements. Fig. 3 is a plan view of the front and back ends of the machine; and Fig. 4 is a view of the front.

The framing of the machine is represented as composed of a base, A, supporting a standard, $B^2$, to which are attached the arms B $B^1$, the upper of which carries the shaft C, from which the motive power is communicated to the cam D for operating the thread-carrier or whirl $y'$, and to the eccentric wheels E and F and crank-disk G, for operating, respectively, the feeding device, the shuttle, and the needle, the said cam, eccentrics, and disk being all fast on the said shaft C. The hook or hooked needle $i$ is attached to a slide, I I, which moves up and down in a guide-box, commonly termed the "needle-box," on the front of the upper arm $B^1$, being operated by means of a bowl, $h$, on the stud or crank-wrist H carried by the disk G, which bowl works in a slot, $k$, cut in a plate, K, attached to the needle-slide I. When, therefore, rotary motion is imparted to the shaft C, the consequent rotation of the crank-disk G and wrist H will cause the bowl $h$ to give an up and-down motion to the needle bar or slide I, and with it to the hook $i$. The cams E F and the crank G H are all contained within the needle-box.

The shuttle-operating eccentric F, rotating within the forks $ff$ of the shuttle-operating slide M, will impart a vertical motion to the said slide in the guides provided for it in the needle-box. Near the top of the said slide M is fixed a stud, $n$, which works in a curved slot in and near the end of the lever N, causing the latter to rock on the fixed fulcrum $n'$, which is secured to the arm $B^1$, and thus give to the shuttle-driver O, with which it is connected by the rod $o$, the motion required to drive the shuttle U backward and forward in the race V. This shuttle-race V and the shuttle U are situated above the arm B, which constitutes the table, upon the upper side of which the material to be sewed is supported during the sewing operation, the said race being so secured to the upper arm or framing of the machine as to be held so far above the work-supporting surface that the material to be sewed is free to pass under the said race. The needle or hook $i$, as will be seen, is also arranged above the said arm or table. The shuttle, by its operation above the said arm or table, is caused to pass and carry its thread through the loops of the other thread from the spool 11, which thread is drawn up through the upper surface of the table by the hook, and thereby to produce a lock-stitch. The shuttle is represented as formed with a dovetailed recess along its back, so that it may be supported by a dovetailed projection formed upon the concave face of the race which fits the back of the shuttle. In the back of the shuttle is also formed a groove which commences at its nose or point, and which is continued along its back until it connects and becomes continuous with the dovetailed recess.

Through a hole in the shuttle-race, in a break or interruption in its dovetailed projection, there passes the loop spreader, consisting of a slide, Z, to which is applied a spring, $Z'$, which exerts a tendency to push it forward through the race. The hook-like point of this spreader is on a line with the nose of the shuttle, and it enters the groove in the back of the latter. The said point, when pressed forward by its spring $Z'$, is very near the path of the axial line of the hook. On the back of the shuttle-race V is pivoted, at 21, a lever-catch, $o^1$, which enters into a notch in the spreader, to hold it back when it has been pushed back by the shuttle in the forward movement of the latter. The upper side of this catch $o^1$ is so situated that the shuttle-driver may run along it in the forward movement of the shuttle, and so press and hold it down to lock the spreader. A spring, $o^2$, applied to this catch $o^1$, tends to lift it out of the notch in the spreader. The spreader is held by the spring $Z'$ in a position to catch one side of the loop as the point of the shuttle enters it, and the shuttle as it moves forward into the loop presses back the spreader until the latter is caught by the entry of the lever $o^1$ into its notch, consequent upon an incline, 23, on the lower edge of the shuttle-driver pressing down the said lever, which is then held down, to hold back the spreader, by the lower edge of the shuttle-driver, during the completion of the forward movement of the shuttle, and during a portion of the backward movement thereof, and until the incline 23 has passed over the said lever, and allows the said lever to be raised by the spring $o^2$, thereby leaving the spreader at liberty to be pressed forward by the spring $Z'$, so that it may be ready to spread the next loop into which the shuttle enters.

Attached to the bottom of the needle-box by a fulcrum-pin, 20, is the loop opener or divider 13, which enters and opens the loop of thread drawn up by the hook, for the entry thereinto of the nose of the shuttle, and assists in removing it from the hook. This loop-opener consists of a small lever-like instrument, having its lower and operating extremity tapered laterally and pointed, and arranged opposite to the open side of the hook $i$, at one side of the path of the shuttle, and having its upper end arranged to come in contact with the needle-slide I. A spring, 24, is applied to this instrument, which tends constantly to draw its operating end away from the needle, and to keep its upper end pressed toward the needle-slide. On the lower part of the needle-slide is a projection or cam, $I'$, (see Fig. 1,) for operating the loop-opener. The upper part of the face of this projection or cam has a very gradual inclination, 14, below which, at 15, it is for a short distance parallel with the line of motion of the needle-slide, thence inclines outward and downward, as shown at 16, and has its lower part 17 parallel with the line of motion of the needle-slide.

While the throat of the hook is below the point of the shuttle the upper end of the loop-opener 13 rests against the straight portion of the needle-slide above the projection I′, and the point of the loop-opener is held back out of the way of the loop; but as the hook draws the loop up above the point of the shuttle, the continued upward movement of the slide I brings the inclination 14 into operation on the loop-opener, and throws the point of the loop-opener under the point of the hook and into the loop, where it remains for a time stationary, while the portion 15 passes the upper end of the loop-opener, and until the inclination 16 comes in contact with the loop-opener, and throws its tapered extremity farther into the loop to expand the latter sufficiently for the entry of the point of the shuttle thereinto. After the inclination 16 has passed the loop-opener the latter remains stationary while the parallel portion 17 is passing its upper end during the completion of the upward stroke of the needle, and also during the first portion of the descent of the needle. The descent of the needle leaves the loop slack on the loop-opener, which retains the loop, while the hook, by its descent, liberates it, and as the needle continues descending the shuttle is advancing, and enters the loop just as it is liberated by the retirement of the loop-opener, consequent upon the parallel position 17 of the projection I′, passing out of contact from the upper portion of the loop-opener.

The whirl or carrier *y′*, which is arranged concentrically to the axis or center line of the hook *i*, in suitable bearings within the table B, is made hollow for the entry of the hook, and provided with an eye for the passage of the thread, which is to be supplied to the hook from the spool 11, and the said carrier is provided or constructed with an external cog-wheel, *y*, which gears with a cog-wheel, Y, which is arranged within or below the arm or table B, and which carries a crank-pin, which is connected by a horizontal rod, X, with the lower end of a lever, W, which works on a fulcrum, *w*, secured to the standard $B^2$. The upper end of this lever carries a pin, *w′*, which enters a groove in the cam D, which produces an oscillating movement of the said lever W, thereby producing a reciprocating longitudinal movement of the rod X, which produces an alternate partial rotary motion of the cog-wheel Y, which imparts a motion of similar character to the cog-wheel *y* and carrier *y′*, by which, when the hook has descended into the central opening of the carrier, the latter is caused to lap or lay the thread around the hook, preparatory to forming the loop. The cam D is of such shape and so arranged on the shaft C with relation to the hook-operating mechanism that the whirl or carrier *y′* has its movement so timed relatively to the movement of the hook that it operates in the following manner, viz: It moves in a direction to lay the thread around or set it in the throat of the hook immediately after the hook has arrived at its full downstroke, and after so laying or setting the thread it remains stationary while the hook is drawing up the loop through the material, and not only until after the upstroke of the hook has been completed, but during considerably more than half the descent of the hook, so that not only is it stationary until the loop is released from the hook, but so long as the loop remains in such condition that its being twisted by the movement of the thread-carrier would render it liable to be brought into the path of the needle. After this the thread-carrier is moved in the opposite direction to that first mentioned, so as to be again in position to commence the laying or setting of the thread in the hook immediately after the latter has completed its second downstroke, and so on.

By this system of timing the operation of the whirl or carrier and the hook, the whole movement of the carrier or whirl is obtained while the loop is slack, and hence there is no unnecessary draft, and, consequently, no unnecessary wear on the thread by the carrier or whirl, and no unnecessary wear on the carrier or whirl itself.

The feed-eccentric E in the course of its rotation comes in contact with the rod P, and through it raises one end of the lever Q, to which the said rod is attached, and which, by its rocking on the fulcrum *q*, which is secured to the arm $B^1$, causes the other end to force down the rod R. This rod R is connected by a knee joint, *r*, with a second rod, S, at the lower end of which is the serrated plate *s*, connected with it by a hinge-joint. The serrated plate *s* is held in its position on the arm B by a spring, T, fixed to bar R by the pin *t* at such an angle that the upward pull of the hook *i* through any material placed under the serrated plate *s* is not sufficient to move the bar S from its normal position.

From this arrangement it follows that when the rod R R is depressed in the way described above, the motion is communicated by the rod S to the serrated plate *s*, thus feeding forward any material placed between it and the arm B in any direction within certain limits, at the will of the operator. When the rotation of the eccentric E relieves the pressure on rod R the spring T causes the serrated plate *s* to return to its normal position.

The rod R is of cylindrical form from 3 to 4, and thus is capable of turning on its axis in the bearings 5 5 on the arm $B^1$, unless turned upon its axis and fixed to feed in the required direction by tightening the screw 6, which passes through block 7. The block 7 is arranged to slide in a slot cut in the plate at the front of the needle-box.

It will be seen that the direction in which the work is propelled will depend upon the position to which the serrated plate is turned and secured by the adjustment of rod R. The length of the stitch is regulated by the screw 8 at the top of the rod R.

Instead of there being a serrated plate, *s*, hinged to the rod S, the end of the rod S may be fork-shaped, to feed the material.

On the shaft C is an eccentric, *d*, that, in a portion of its revolution, raises a slide, 10, forcing it against the bottom of the spool 11, on which the under thread is wound, and thereby preventing or checking the rotation of the said spool.

Having thus described the construction of the machine, and the operations of its several parts, we now proceed to explain in what manner the stitch is formed. Supposing the material to be fixed in the position to be sewed, on the arm or table B, under the serrated plate *s*, by the rotation of the shaft C the hook *i* will be forced through it to the required depth through the center of the whirl or carrier *y'*. At this time the feeding device S *s* is released by the rotation of the eccentric E, and recovers its normal position, as herein-before described. As the hook ascends, the under thread, supplied by the spool or bobbin 11, through proper guides, to the carrier *y'*, is laid in the hook by the rotation of the carrier *y'*, actuated, as before described, by cam D, the whirl or carrier completing its rotation before the hook draws the thread up into the material being sewed. The eccentric *d* then raises the slide 10 and presses it against the bobbin 11, thus enabling the hook to pull up the loop of thread released from the heel of the shuttle U, and then tighten it over the thread supplied by the shuttle, forming a lock-stitch in the center of the material. Before the hook *i* has reached its highest point the shuttle-driver O has carried the shuttle U to the end of the race V, and the eccentric *d* in its rotation has released the slide 10 from its pressure against the bobbin 11, and the projection I', at the back of the needle-slide I I, by working against the upper portion of the loop-opener 13, forces its lower end under the point of the hook *i*, thus dividing the loop which it has brought up through the material. At this time the point of the shuttle begins to enter between the divided sides of the loop, the hook makes a slight descent, and then rests awhile, relieving the strain on the loop, which, as the shuttle proceeds, is caught by the spreader Z entering the groove in the back of the shuttle. The hook now continues its descent, and at the same time the feeding device moves the material. The loop is released from the hook and held in its position over the shuttle by the spreader Z until the shuttle has reached its farthest point. During the next ascent of the needle the loop is pulled tight over the shuttle-thread, as before described, thus forming with two wax threads the ordinary shuttle or lock-stitch.

What we claim as our invention is—

1. The combination, in a sewing-machine, of the following instrumentalities, viz: a table or surface on which the material to be sewed is supported, a feeding instrument to move the material along said table or surface, a shuttle arranged on the same side of said table or surface with the material, a hook, and a rotating thread-guide, all co-operating substantially as herein set forth, to produce a lock-stitch with two threads.

2. The combination, in a sewing-machine for producing a lock-stitch with two threads, of a shuttle and hook, both arranged above the table or support, on the upper side of which the material to be sewed is supported, substantially in the manner herein described.

3. A sewing-machine, having its shuttle and shuttle-race placed above the table or support, upon the upper surface of which the material to be sewed is supported, as herein described.

4. The combination, with a hook and a shuttle, both placed above or on the same side of the table of a sewing-machine, of an instrument for dividing or opening the loop and assisting to remove it from the hook, substantially as herein described.

5. The combination, with the hook and thread-carrier, of mechanism for operating the same, so timed that the thread-carrier, after having laid the thread around the hook, rests while the hook is drawing up the loop through the material, and until the hook has performed the greater portion of its descent, and makes its return movement only after the loop has been released from the hook, whereby the whole movement of the carrier is obtained not only while the loop is slack, but while the latter is not liable to be brought into the path of the needle, substantially as herein described.

6. The combination, with the needle-bar, the feeding device, and the shuttle-driver of a sewing-machine, of the eccentrics E F, and crank G H, all upon the same shaft and within the needle-box, substantially as herein described.

7. The combination of the rod R, capable of turning on its axis, and having a longitudinal reciprocating motion, the rod S, pivoted thereto, and the serrated plate *s* or fork attached to or provided on said rod S, the whole operating to feed in various directions, substantially as herein described.

In testimony whereof we, the said JOHN KEATS and WILLIAM STEPHENS CLARK, have subscribed our names each in the presence of two subscribing witnesses.

JOHN KEATS.
WILLIAM STEPHENS CLARK.

Witnesses to the signature of John Keats:
HENRY T. BROWN,
HENRY MCRICHARD.

Witnesses to the signature of William Stephens Clark:
CHARLES MCLAREN,
WALTER S. B. MCLAREN.